(12) United States Patent
Bujewicz et al.

(10) Patent No.: US 11,060,536 B2
(45) Date of Patent: Jul. 13, 2021

(54) SPOOL SERVO VALVE (71) Applicant: Hamilton Sundstrand Corporation, Charlotte, NC (US)

(72) Inventors: Maciej Bujewicz, Wroclaw (PL); Marcin Korczynski, Dolnyslask (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/832,197

(22) Filed: Mar. 27, 2020

(65) Prior Publication Data

US 2020/0309163 A1  Oct. 1, 2020

(30) Foreign Application Priority Data

Mar. 29, 2019  (EP) .................................... 19461524

(51) Int. Cl.
*F16B 13/04* (2006.01)
*F16K 11/07* (2006.01)
*F15B 13/04* (2006.01)
*F15B 13/043* (2006.01)

(52) U.S. Cl.
CPC ...... *F15B 13/0402* (2013.01); *F15B 13/0438* (2013.01); *F16K 11/0708* (2013.01)

(58) Field of Classification Search
CPC .. F16K 31/008; F16K 11/0708; F15B 21/003; F15B 13/0435; F15B 13/0402; F15B 13/0438; F15B 2013/041
See application file for complete search history.

(56) References Cited

U.S. PATENT DOCUMENTS

| 3,719,199 A * | 3/1973 | Mentink ............. F16K 11/0712 137/269 |
| 4,527,592 A | 7/1985 | Dotti et al. |
| 5,133,386 A | 7/1992 | Magee |
| 10,024,444 B2 | 7/2018 | Kopp et al. |
| 2003/0140974 A1* | 7/2003 | Suilmann ............ F16K 27/0263 137/625.26 |

(Continued)

FOREIGN PATENT DOCUMENTS

| CA | 2221667 A1 | 5/1999 |
| DE | 1650559 B1 | 2/1970 |

OTHER PUBLICATIONS

European Search Report for Application No. 19461524.1, dated Sep. 16, 2019, 7 pages.

*Primary Examiner* — Kelsey E Cary
(74) *Attorney, Agent, or Firm* — Cantor Colburn LLP (57) ABSTRACT

A servo valve includes a valve housing, a cavity formed in the valve housing defining an axis (X) and an axially moveable member disposed in the cavity. The member comprises flat surfaces parallel to the axis (X). A channel is formed within the cavity and a plurality of ports each forming a fluid passage through the valve housing in fluid communication with a spool and with the channel. The plurality of ports include first and second nozzles with nozzle openings, wherein in a first axial position of the member the first nozzle opening is at least substantially obstructed by the first flat surface, and in a second axial position of the member the second nozzle opening is at least substantially obstructed by the second surface, the member controlling fluid between the spool and the channel.

15 Claims, 6 Drawing Sheets

(56) References Cited

U.S. PATENT DOCUMENTS

| | | | |
|---|---|---|---|
| 2003/0221731 A1* | 12/2003 | Ogura | F16K 27/041 137/625.69 |
| 2004/0089355 A1* | 5/2004 | Nirasawa | G05D 16/101 137/625.69 |
| 2008/0163939 A1* | 7/2008 | Williams | F15B 20/008 137/596.14 |
| 2009/0078112 A1* | 3/2009 | Eschweiler | F15B 13/0402 91/461 |
| 2010/0264348 A1* | 10/2010 | Kinch | F15B 13/0407 251/321 |
| 2012/0012768 A1* | 1/2012 | Yahr | F16K 1/02 251/129.11 |
| 2013/0019958 A1* | 1/2013 | Miyazoe | F16K 11/02 137/115.1 |
| 2016/0153556 A1* | 6/2016 | Kenkel | F16K 11/06 137/1 |
| 2017/0097100 A1* | 4/2017 | Patterson | E21B 34/16 |
| 2018/0372128 A1 | 12/2018 | Jaskiewicz et al. | |

* cited by examiner

SPOOL SERVO VALVE

FOREIGN PRIORITY

This application claims priority to European Patent Application No. 19461524.1 filed Mar. 29, 2019, the entire contents of which is incorporated herein by reference.

TECHNICAL AREA

The present disclosure relates to servo valves, and in particular spool servo valves. Such spool valves are often used in hydraulic systems for aerospace applications.

BACKGROUND

Servo valves are well-known in the art and can be used to control the flow of fluid, for example hydraulic fluid to an actuator or fuel flow to a combustor. In one type of servo valve, a flapper is deflected by an armature connected to an electric motor away or towards nozzles, which control fluid flow to the spool valve. Deflection of the flapper can control the amount of fluid injected from the nozzles, and thus the amount of fluid communicated to the actuator via the spool valve. In this way, servo valves can allow precise control of actuator movement.

SUMMARY

According to an embodiment of the present disclosure, there is a servo valve comprising a valve housing, a cavity formed in the valve housing and defining a longitudinal axis, a member disposed in the cavity and axially moveable therein along said longitudinal axis, wherein the member comprises first and second cavity sealing sections, having first and second cross-sectional areas, for engaging an inner surface of the valve housing defining the cavity, first and second nozzle obstructing sections arranged between the first and second cavity sealing sections, a middle portion located between the first and second nozzle obstructing sections and having a third cross-sectional area smaller than both the first and second cross-sectional areas so as to form a channel within the cavity bounded by the first and second nozzle obstructing sections, and first and second surfaces formed respectively on the first and second nozzle obstructing sections arranged parallel to the direction of the longitudinal axis, and a plurality of ports, each forming a fluid passage through the valve housing in fluid communication with the channel, the plurality of ports comprising first and second ports having first and second nozzles with first and second nozzle openings for providing fluid communication between the channel and a spool, wherein in a first axial position of the member the first nozzle opening is at least substantially obstructed by the first surface and the second nozzle opening is at least substantially unobstructed by the second surface, and in a second axial position of the member the second nozzle opening is at least substantially obstructed by the second surface and the first nozzle opening is at least substantially unobstructed by the first surface.

The flat surfaces may be flat portions of an otherwise cylindrical nozzle obstructing section.

The servo valve may comprise at least one actuator configured to axially move the member within the cavity.

The at least one actuator may comprise a pair of actuators arranged at opposite axial ends of the member.

Each at least one actuator may be a solenoid.

The servo valve may comprise at least one cover plate arranged to seal the at least one actuator within the valve housing.

The servo valve may further comprise a spring arranged between first and second axial ends of the valve housing, the spring operatively connected with the member and configured to bias the member towards a neutral axial position.

The term 'neutral axial position' may correspond to a central position between the first and second axial positions, and may be where both nozzle openings are at least substantially unobstructed.

The term 'spring' as used herein should be understood to refer to any resilient member that can provide a biasing force when deformed.

The term 'operatively connected' should be understood to mean that the spring acts on the member either through direct or indirect contact therewith.

The spring may comprise a radially-inner end received in a slot formed in the member.

The spring may comprise an elastic, radially-extending spring portion (32) having the radially-inner end.

The radially inner end may comprise an expanded section with a curved surface which contacts a wall of the slot.

The servo valve may further comprise at least one hole extending through a spring attachment portion of the spring and into the valve housing and at least one indicator pin positioned in the at least one hole. There may be a pair of such pins on opposed sides of the spring attachment portion, The third cross-sectional area may be less than 0.75 times the size of each of the first and second cross-sectional areas.

The servo valve may further comprise O-ring seals arranged around each of the first and second cavity sealing sections to sealingly engage the member and the valve housing.

One or more of the ports may comprise a screen filter.

The servo valve may further comprise a spool in fluid communication with at least one of the plurality of ports for controlling fluid flow to a component.

According to a further embodiment of the disclosure, there is an assembly comprising the servo valve as described in any of the above, and a component in fluid communication with the spool.

The component may be a fuel supply valve or a pneumatic control valve.

DETAILED DESCRIPTION OF THE FIGURES

Figure 1:
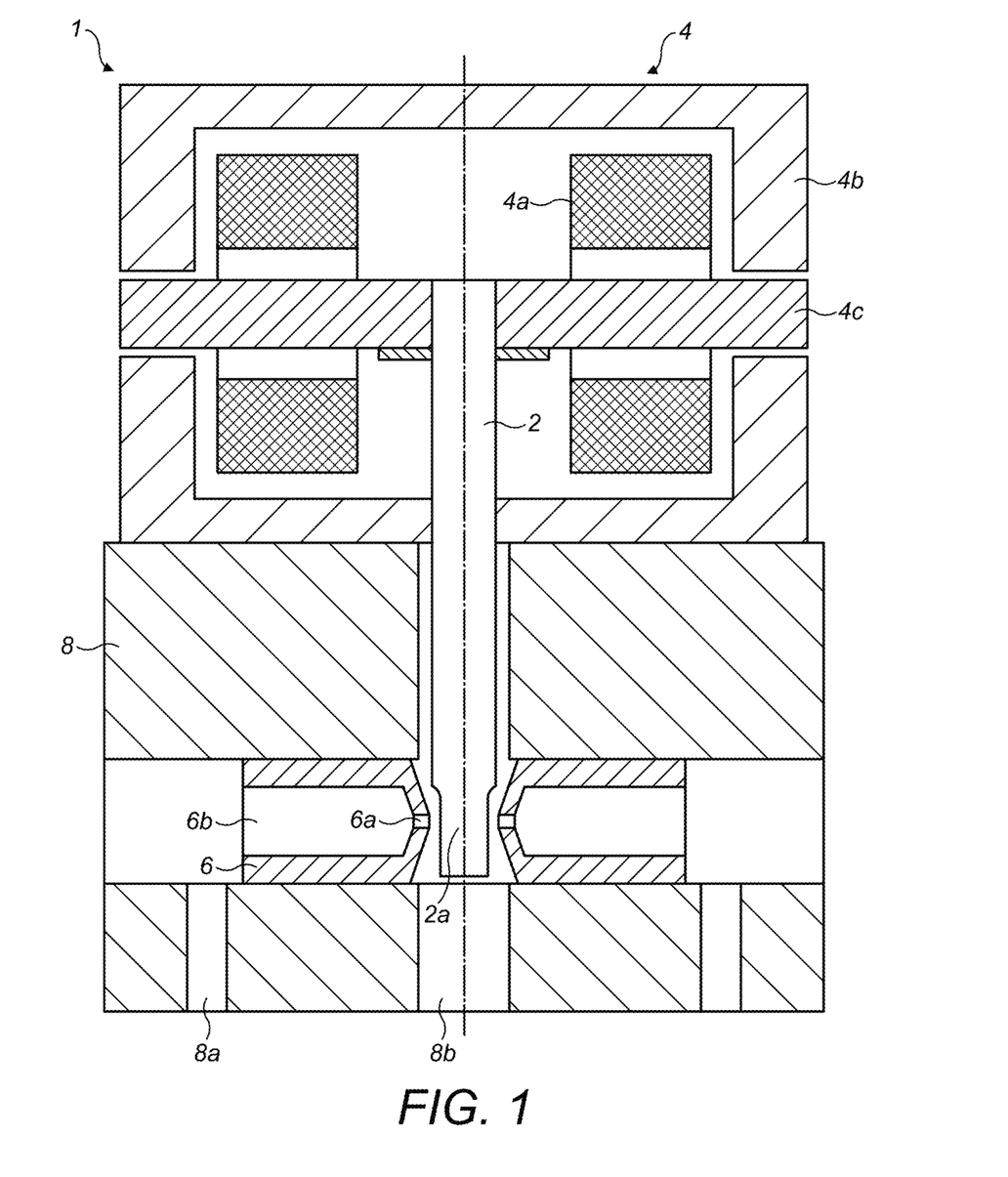
FIG. 1 shows a prior art servo valve.

With reference to FIG. 1, a prior art servo valve 1 is illustrated. Servo valve 1 comprises an electric motor 4, flapper 2, nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to create movement of armature 4c, as is well-known in the art. Flapper 2 is attached to armature 4c, and is deflected by movement of the armature 4c. Nozzles 6 are housed within nozzle housing 8 via an interference fit and comprise a fluid outlet 6a and fluid inlet 6b. Housing 8 also has a port 8a, which allows communication of fluid to the nozzles 6.

The flapper 2 comprises a blocking element 2a at an end thereof which interacts with fluid outlets 6a of nozzles 6 to provide metering of fluid from the fluid outlets 6a to a fluid port 8b in the housing 8, which allows communication of metered fluid from the nozzles 6 to an actuator via a spool valve input (not shown). As is known in the art, the electric motor 4 is used to control deflection of the blocking element 2a and vary the fluid delivered to the actuator from nozzles 6, as required.

Figure 2:
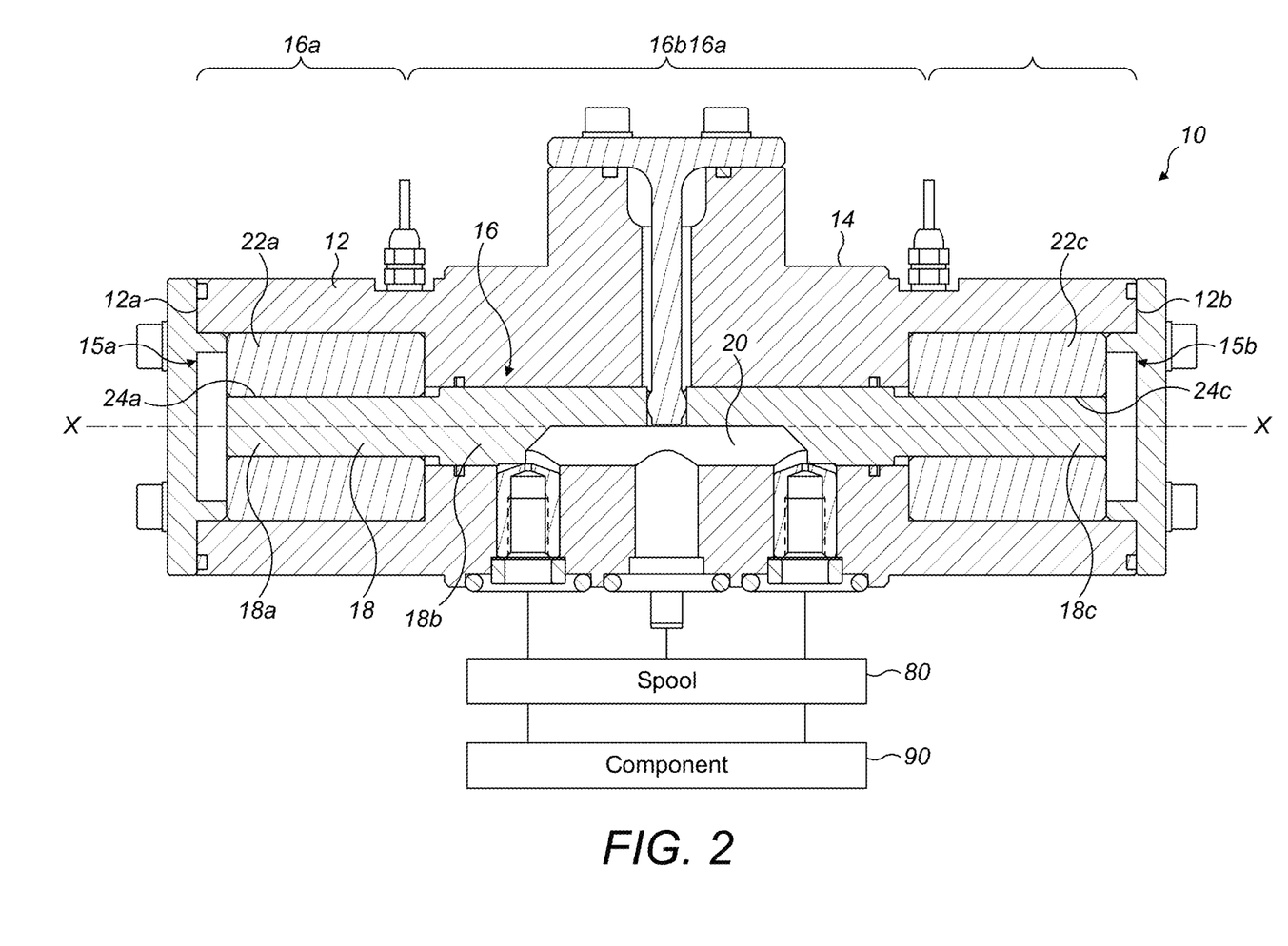
FIG. 2 shows a middle view of a servo valve in accordance with the present invention.
Figure 3:
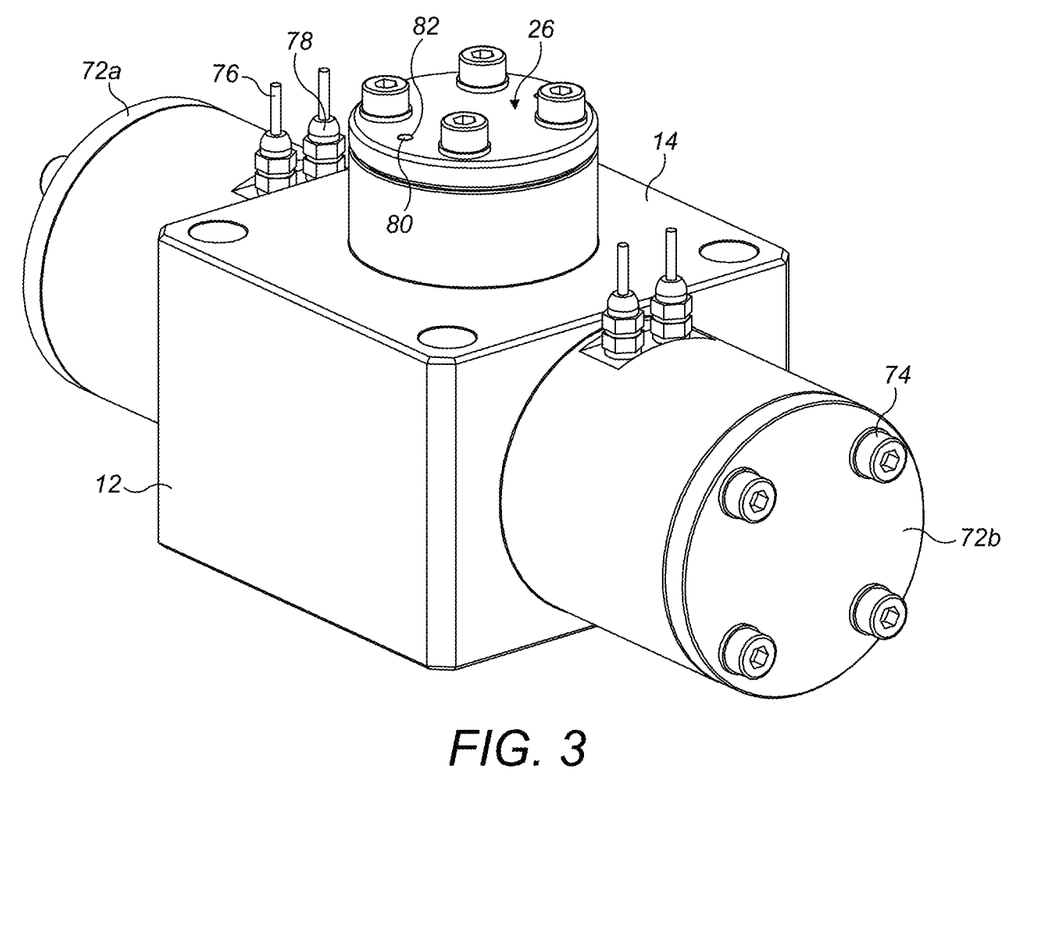
FIG. 3 shows a perspective exterior view of the valve of FIG. 2.

FIGS. 2 to 6 illustrate a servo valve 10 in accordance with the present disclosure. FIG. 2 also shows, in a schematic manner, a spool 80 driveably connected to the servo valve 10 and a component 90 controlled by the position of the spool 60a, 60b. The component 70 may be an actuator.

The valve 10 comprises a valve housing 12 with an outer surface 14 and a longitudinal cavity 16, the longitudinal cavity 16 defining a longitudinal axis X through the valve housing 12. The valve housing 12 has first and second axial ends 12a, 12b, and the longitudinal cavity 16 forms openings 15a, 15b in the outer surface 14 at each of the first and second axial ends 12a, 12b.

An elongated member (or 'rod') 18 is disposed in the longitudinal cavity 16, extending along the axis X. The cavity is notionally separated into first, second and third axially arranged sections 16a, 16b and 16c. The member 18 comprises first and second axial end portions 18a, 18c, either side of a central portion 18b. The first and second axial end portions 18a, 18c are predominantly disposed in the first and third sections of the longitudinal cavity 16a, 16c, and the central portion 18b is predominantly disposed in the second section of the longitudinal cavity 16b. The central portion of the member 18b is shaped so as to form a channel 20 in the second section of the longitudinal cavity 16b, as will be described in further detail below.

A first solenoid 22a is disposed in the first section of the longitudinal cavity 16a, and a second solenoid 22c is disposed in the third section of the longitudinal cavity 16c. The solenoids 22a, 22c are each in a press fit with the valve housing 12. Each solenoid 22a, 22c has a respective central opening 24a, 24c extending axially entirely therethrough. The member 18 is arranged so that the first and second end portions 18a, 18c of the member 18 are disposed within the central openings 24a, 24c of the respective solenoids 22a, 22c.

One or both solenoids 22a, 22c may be, for example, an annular solenoid forming a ring shape around the axis X.

The member 18 is moveable within the longitudinal cavity 16 between at least first and second axial positions. The solenoids 22a, 22c are configured to actuate axial movement of the member 18, as described in more detail below.

While solenoids are used in the example embodiment, it is to be understood that a pair of other actuators could be used to provide the same effect, for example a pair of piezoelectric actuators.

Figure 4:
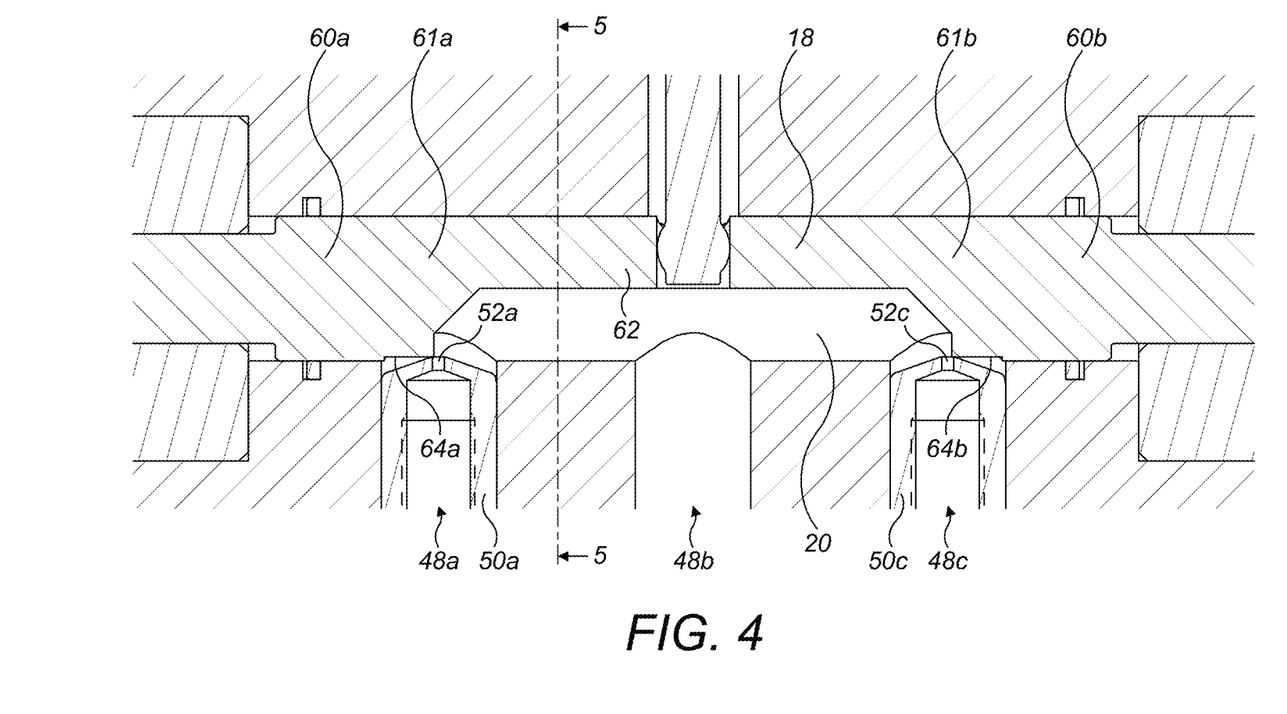
FIG. 4 shows a detail middle view of a portion of the valve of FIG. 2.
Figure 5:
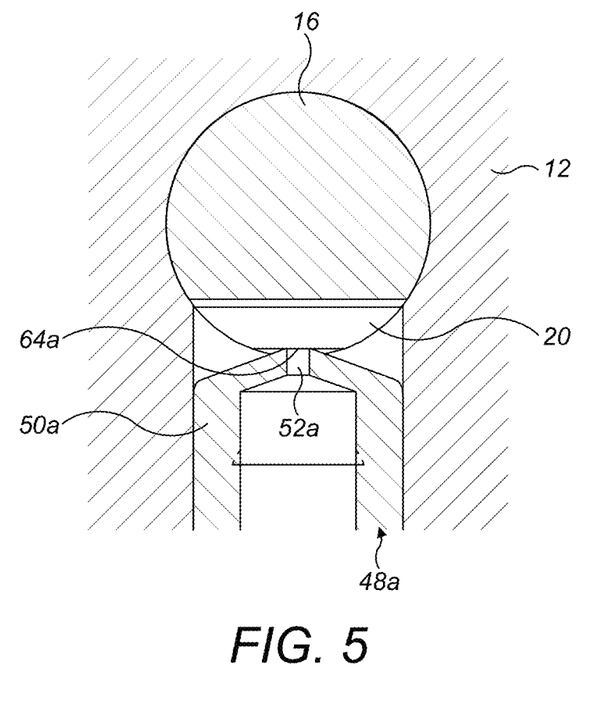
FIG. 5 shows a cross sectional view along the line 5-5 in FIG. 4.

As best seen in FIGS. 4 and 5, the central portion of the member 18b comprises a pair of cavity sealing sections 60a, 60b axially separated by a pair of nozzle obstructing sections 61a, 61b, in turn axially separated by a middle section 62. The cavity sealing sections 60a, 60b have generally the same axial cross-section shape as the second section of the cavity 16b. The cavity 16 has a size only slightly larger than a size of the cavity sealing sections 60a, 60b, so that the member 18 is supported in place in the cavity 18 in a sliding, sealing fit. The cavity 16 and the cavity sealing sections 60a, 60b may both be cylindrical as in the embodiment shown, having substantially circular cross-sectional shapes.

The middle portion 62 comprises a reduced cross-sectional area as compared to the cavity sealing sections 60a, 60b, and therefore has a significantly smaller cross-sectional area than the cavity. The resulting space not occupied by the middle portion 62 forms the channel 20. The channel is thereby formed between the cavity sealing sections 60a, 60b. In a particular embodiment, the reduced cross-sectional area may be less than 0.75 times the cross-sectional area of the cavity, or around 0.5 times the cross-sectional area of the cavity.

The middle portion 62 may comprise a cross-sectional shape which changes along the axis X, as in the embodiment shown, or a cross-sectional shape that is constant along the axis X.

The nozzle obstructing sections 61a, 61b have substantially the same cross-sectional shape as the cavity sealing sections 60a, 60b, with the exception that each comprises a flat, radially-facing surface 64a, 64b. The surfaces 64a, 64b are generally parallel to the direction of the axis X. Each surface 64a, 64b is adjacent to the middle portion 62 where the cross-sectional area of the member 18 is reduced.

The flat surfaces 64a, 64b may have a depth that is less than 5% of cross-sectional height of the cavity sealing sections 60a, 60b. The flat surfaces 64a, 64b may extend along a cross sectional width of less than 50% and/or greater than 25% of the cross-sectional diameter of the cavity sealing sections 60a, 60b.

The surfaces 64a, 64b are positioned so as to face ports 48a, 48b, 48c of the servo valve 10 in the radial direction.

Ports 48a, 48b, 48c are formed in the valve housing 12 and extend fully between the outer surface 14 of the valve housing 12 and the cavity 16. The ports 48a, 48b, 48c thereby provide a means of fluid communication into the valve housing 12 from the outer surface 14 to the cavity 16. Respective openings of the ports 48a, 48b, 48c are located in the cavity 16.

The member 18 can be located in the cavity 16 such that the openings of the ports 48a, 48b, 48c are located axially between the cavity sealing sections 60a, 60b of the central portion 18b. In that location of the member 18, the openings of the ports 48a, 48b, 48c are therefore in fluid communication with the channel 20 formed by the member 18.

The ports comprise a supply port 48a, a control port 48b and a return port 48c. The supply port 48a is linked to a supply of fluid (not shown) to communicate fluid from the supply to the channel 20. The control port 48b is linked to a downstream component, to communicate fluid from the annular channel to the downstream component. The return port 48c operates to return fluid to a supply or atmosphere.

The supply port 48a and the return port 48c comprise respective nozzles 50a, 50c, having respective nozzle openings 52a, 52c. The surfaces 64a, 64b may be parallel to an upper surface of the respective nozzles 50a, 50c at the nozzle openings 52a, 52c with a small separation therebetween.

In the first axial position of the member 18, a first one of the surfaces 64a is aligned with supply port nozzle opening 52a, and thereby substantially or fully obstructs the supply port nozzle opening 52a. The alignment may fluidly seal the nozzle opening 52a. In the first axial position, the return port nozzle opening 52c is substantially or fully unobstructed, because a second one of the surfaces 64b is axially spaced from the return port nozzle opening 52c.

The member 18 may be moved from the first axial position partially towards the second axial position by the solenoids 22a, 22c in a manner described in more detail below.

As the member 18 is moved from the first axial position partially towards the second axial position, the first surface 64a moves axially relative to the supply port nozzle opening 52a, such that the first surface 64a is further from the supply port nozzle opening 52a, and only partially obstructs the supply port nozzle opening 52a, obstructing the supply port nozzle opening 52a to a lesser extent than in the first axial position. As such, a partial fluid flow is allowed through the nozzle opening 52a, although the fluid flow is less than if the nozzle opening 52a were substantially or fully unobstructed.

At the same time, the second surface 64b partially engages the return port nozzle opening 52c in a similar manner as described above, preventing some of the fluid flow therethrough.

As the member 18 moves further from the first axial position fully towards the second axial position, the first surface 64a moves further from the supply port nozzle opening 52a such that fluid may flow through substantially or fully unobstructed. At the second axial position, the second surface 64b is proximate the return port nozzle opening 52c and substantially or fully prevents any fluid flow therethrough.

The control port 48b is at least substantially unobstructed independent of the axial position of the member 18.

The operation described above allows the control of fluid through the respective ports 48a, 48b, 48c by controlling an axial position of the member 18. As will be described further below, the member 18 can be moved, in a continuous manner, to any axial position between the first and second axial positions; hence, fluid flow through the ports 48a, 48b, 48c can be controlled to provide partial flow through the supply and/or return ports 48a, 48c.

As described above, the surfaces 64a, 64b form flat, radially-facing surfaces. As a result, the surfaces 64a, 64b are arranged generally perpendicular to the nozzle openings 52a, 52c. This allows precise more precise calibration and control of fluid flow entering and leaving the nozzle openings 52a, 52c, minimising possible leakage through the nozzle openings 52a, 52c. The overall shape of the member 18 is also more easy to machine than, for example, a member which covers nozzle openings 52a, 52c with an angled and/or curved surface.

The solenoids 22a, 22c provide means for axially moving the member 18. The first and second end portions of the member 18a, 18c, which are respectively disposed within the solenoids 22a, 22c as described above, each comprise a ferromagnetic material. A current can passed through either solenoid 22a, 22c to induce a magnetic field. The interaction of the magnetic field and the ferromagnetic material of the respective axial end causes an axial movement of the member 26, moving the member 18 from the first to the second axial position. By this mechanism, one of the solenoids 22a, 22c may be activated at a time in order to induce an axial movement. The solenoids 22a, 22c may each independently actuate movement in either axial direction by changing the polarisation of the circuit.

Both of the first and second solenoids 22a, 22c are configured so as to induce an axial movement of the member 18 in either axial direction. As such, either the first or second solenoid 22a, 22c may be used for the same function, providing a redundancy in the valve assembly 10 should the other solenoid fail in use. The solenoids need not be activated simultaneously.

Figure 6:
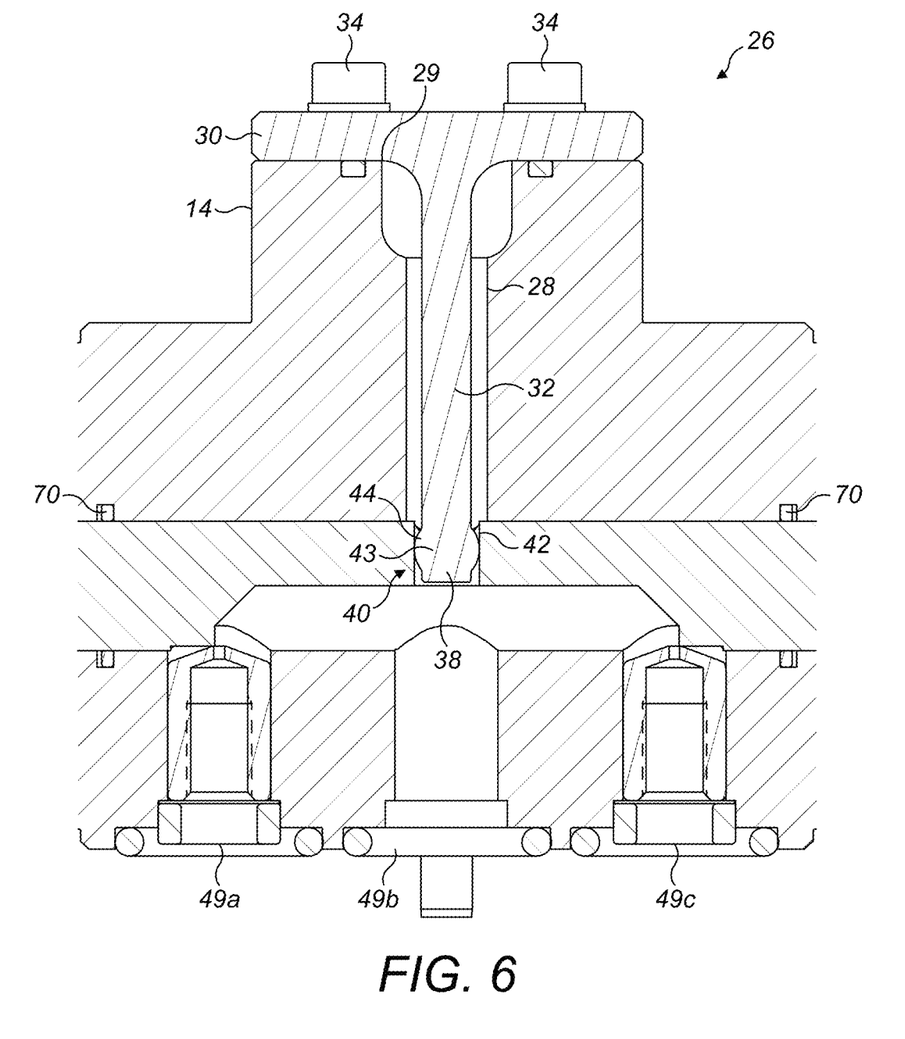
FIG. 6 shows another detail middle view of a portion of the valve of FIG. 2.

As best seen in FIG. 6, the servo valve 10 further comprises a spring 26. The spring 26 is arranged near the axial centre of the servo valve 10, at one radial side (i.e. the top in FIG. 2) of the longitudinal cavity 16 adjacent to the second, central section 16b. The spring 26 is partially disposed in a spring cavity 28 formed within the valve housing 12. The spring cavity 28 has an opening 29 at the outer surface 14 of the valve housing 12 at one radial side, and extends radially from the opening 29 into the longitudinal cavity 16 at the second section 16b.

The spring 26 comprises an attachment portion 30 and an elastic, deformable spring portion 32. The attachment portion 30 is disposed external to the valve housing 12, and forms a planar shape which is arranged flush to the outer surface 14. The attachment portion 30 is fixed to the valve housing 12 by fasteners 34, and forms a seal with the outer surface 14 to seal the spring cavity opening 29. In the example shown, the fasteners 34 are screws and washers.

The spring portion 32 is fixed to the attachment portion 30 and extends from the attachment portion 30 into the spring cavity 28. The spring portion 32 extends fully along the radial length of the spring cavity 28 from a radially outer end 36 adjacent the attachment portion 30 to a radially inner end 38 which is disposed in the longitudinal cavity 16 at the second section 16b. The spring portion 32 resists deformation along the axis A thereof. Other types of biasing means to the spring shown could be used.

The central portion of the member 18b comprises a slot 40. The slot 40 is sized to receive the radially inner end 38 of the spring portion 32, which is arranged therein. The radially inner end 38 contacts side walls 42 of the slot 40.

The spring portion 32 is elastic such that it may be deformed and subsequently return to its initial position. When neither of the solenoids 22a, 22c is actuated, the spring portion is in an un-deformed state and the member 18 is in an unbiased position between the first and second axial positions, for example as shown in the figures. When one of the solenoids 22a, 22c is actuated, the member 18 moves to the first or second axial position depending on the polarisation of the circuit. The axial movement of the slot 40 moves the radially inner end 38 of the spring portion 32 via contact between the end 38 and the slot walls 42. The spring portion 32 is consequently bent along the radial direction.

The bending of the spring portion 32 results in an elastic force biasing the spring portion 32 back to the initial, un-deformed position. This elastic force acts on the member 18 via the interaction of the radially inner end 38 and the slot walls 42. When the actuated solenoid 22a, 22c is deactivated once again, the elastic force acts to return the member 18 to the unbiased position.

The extent of the axial movement of the member 18 is determined by the balance in forces induced by either solenoid 22a, 22c and the elastic force of the spring 26. The elastic force produced by the spring portion 32 is proportional to the extent of the axial displacement of the member 18. The force induced by the magnetic fields of the solenoids 22a, 22c is proportional to the current passing therethrough. The current through the solenoids 22a, 22c can be varied to control the force induced, and hence control the amount of axial movement of the member 18. It therefore follows that the solenoids 22a, 22c can move the member 18 to any number of axial positions between the first and second axial positions and the unbiased position.

By providing a spring 26 which is arranged between the axial ends 12a, 12b of the valve housing 12 (rather than at one or other end), the valve can be arranged more compactly. Furthermore, the spring 26 facilitates the use of two solenoids 22a, 22c, which provides redundancy as described above.

The radially inner end 38 of the spring portion 32 comprises an expanded section 43 with curved outer surfaces 44. The expanded section 43 is disposed within the slot 40, and the curved surfaces contact the slot walls 42 at respective point contacts. As the spring portion 32 bends in the radial direction, the radially inner end 38 is rotated relative to the slot walls 42. The curved shape of the expanded section 43 is such that the radially inner end 38 fully maintains the point contact with the slot walls 42 throughout the rotation induced by bending of the spring member 32, from un-deformed to fully-deformed states.

The curved surface allows the expanded section 43 to move easily relative to the slot walls 42 as compared to a flat surface, due to the reduced friction. This helps limit sticking and slipping of the spring portion 32, which could result in imprecise movement of the member 18. Furthermore, by ensuring that point contact is maintained between the radially inner end 38 and the slot walls 42, the elastic force is exerted on the slot walls 42 in a more predictable and controllable manner. The expanded section 43 thereby provides more control over the movement of the member 18.

The described valve provides a means for selectively controlling fluid flow using a desirably simplified construction. For example, a one-piece member may be used to reduce the connections required between parts.

The simple construction of the present disclosure also reduces the need to cut air gaps between components.

The member 18 of the present arrangement fulfils the role of the flapper of the prior-art valve; however, by comparison, the member 18 of the present valve 10 requires relatively little calibration.

In order to calibrate the servo valve 10, it is necessary to arrange the member 18 in the unbiased position, so that the member is symmetrically arranged relative to the nozzle openings 52a, 52c. That is, the unbiased position is halfway between the first axial position where the supply port 48a is fully blocked, and the second axial position where the return port 48c is fully blocked. This ensures symmetrical opening of the supply and return ports 48a, 48c and therefore precise operation of the valve 10.

During a calibration process, the spring 26 is in position in the slot 42 of the member 18, but is not fastened to the outer surface 14. The member 18 is moved manually with the spring 26 in situ until it is determined that the unbiased position has been reached. The spring 26 is then fastened to the outer surface 14 as described above. Additionally, once the spring is fastened, a hole or holes 80 may be drilled through the spring attachment portion 30 and concurrently through the valve housing 12. Indicator pins 82 may then be inserted into the holes. If the valve 10 is disassembled and reassembled, the holes 80 may be used to indicate the position that the spring 26 should be reattached in by using the indicator pins 82 to hold the attachment portion 30 in place on the valve housing 12 while the fasteners 34 are secured.

It is desirable to more effectively seal the channel 20 formed by the member 18 to prevent any fluid encroachment through the cavity openings 15a, 15b. As described above, this might be partially achieved by matching the size of cavity sealing sections 60a, 60b of the central portion 18b with a size of the second section of the cavity 16b. However, O-ring seals 70 might also be provided on axially opposed sides of the channel 20 (proximate the cavity sealing sections 60a, 60b), sealingly engaging the member 18 and the surrounding valve housing 12 and providing additional sealing of the channel 20.

Sealing prevents fluid encroachment out of the cavity 16, and additionally prevents undesirable entry of contaminants into the interior of the valve 10. However, the sealing provided by the size-matching of the member 18 and cavity 16, and/or by the O-ring seals 70, does not prevent contamination of components exterior to the second section of the cavity 18b such as the solenoids 22a, 22c.

To this end, cover-plates 72a, 72b may be provided at the axial ends of the valve housing 12a, 12b, as best seen in FIG. 2. The cover plates 72a, 72b extend radially to cover the openings 15a, 15b to seal the first and third sections of the cavity 18a, 18c and protect the interior solenoids 22a, 22c. The cover plates may comprise copper ring seals (not shown) on an interior of each of the cover plates 72a, 72b to seal the first and third sections 18a, 18c. The cover plates are attached to the axial ends 12a, 12b with fasteners 74. In the embodiment shown, the fasteners are screws and washers.

The solenoids 22a, 22c may be powered by an external source. To this end, electrical wires 76 are run through the valve housing 14 from an exterior into the respective first and third sections of the cavity 18a, 18c. The electrical wires 76 are sealingly attached to the outer surface 14 by wire clamps 78, which prevent contaminant entry or leakage.

As best seen in FIG. 6, the ports 48A, 48B, 48C may be provided with respective screen filters 49A, 49B, 49C to help prevent contaminants from entry into the valve 10 via any of the ports.

In an embodiment, the above-described valve 10 may be used as part of a fuel-metering system, where the fluid passing through the valve is a fuel, the supply is a fuel supply, and the downstream component is a part of an engine requiring fuel.

In an alternative embodiment, the above-described valve 10 may be part of a pneumatic system, where the fluid passing through the valve is air, the supply is an air supply, and the downstream component is an pneumatic actuator.

The valve 10 may be provided as part of an engine for an aircraft, or in an aircraft control surface, for example.

The invention claimed is:

1. A servo valve comprising:
   a valve housing;
   a cavity formed in the valve housing and defining a longitudinal axis (X);
   a member disposed in the cavity and axially moveable therein along said longitudinal axis, wherein the member comprises:
   first and second cavity sealing sections, having first and second cross-sectional areas, for engaging an inner surface of the valve housing defining the cavity;
   first and second nozzle obstructing sections arranged between the first and second cavity sealing sections;
   a middle portion located between the first and second nozzle obstructing sections and having a third cross-sectional area smaller than both the first and second cross-sectional areas so as to form a channel within the cavity bounded by the first and second nozzle obstructing sections, and
   first and second surfaces formed respectively on the first and second nozzle obstructing sections arranged parallel to the direction of the longitudinal axis (X); and a plurality of ports, each forming a fluid passage through the valve housing in fluid communication with the channel, the plurality of ports comprising first and second ports having first and second nozzles with first and second nozzle openings for providing fluid communication between the channel and a spool, wherein in a first axial position of the member the first nozzle opening is at least substantially obstructed by the first surface and the second nozzle opening is at least substantially unobstructed by the second surface, and in a second axial position of the member the second nozzle opening is at least substantially obstructed by the second surface and the first nozzle opening is at least substantially unobstructed by the first surface.

2. The servo valve of claim 1, comprising at least one actuator configured to axially move the member within the cavity.

3. The servo valve of claim 2, wherein the at least one actuator comprises a pair of actuators arranged at opposite axial ends of the member.

4. The servo valve of claim 2, wherein each at least one actuator is a solenoid.

5. The servo valve of claim 2, further comprising at least one cover plate arranged to seal the at least one actuator within the valve housing.

6. The servo valve of claim 1, further comprising a spring arranged between first and second axial ends of the valve housing, the spring operatively connected with the member to bias the member towards a neutral axial position.

7. The servo valve of claim 6, wherein the spring comprises a radially-inner end received in a slot formed in the member.

8. The servo valve of claim 7, wherein the radially inner end comprises an expanded section having a curved surface which contacts a wall of the slot.

9. The servo valve of claim 6, further comprising a hole extending through a spring attachment portion of the spring and into the valve housing and an indicator pin positioned in the hole.

10. The servo valve of claim 1, wherein the third cross-sectional area is less than 0.75 times the size of each of the first and second cross-sectional areas.

11. The servo valve of claim 1, further comprising O-ring seals arranged around each of the first and second cavity sealing sections to sealingly engage the member and the valve housing.

12. The servo valve of claim 1, wherein one or more of the ports comprises a screen filter.

13. The servo valve of claim 1, further comprising the spool in fluid communication with at least one of the plurality of ports for controlling fluid flow to a component.

14. An assembly comprising:
 the servo valve of claim 1, wherein one or more of the ports comprises a screen filter; and
 a component in fluid communication with the spool.

15. The assembly of claim 13, wherein the component is a fuel supply valve or a pneumatic control valve.

* * * * *